(12) United States Patent
Uekusa et al.

(10) Patent No.: US 10,880,457 B2
(45) Date of Patent: Dec. 29, 2020

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventors: Tomotaka Uekusa, Yokohama (JP); Hiroyuki Yaguchi, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/385,795

(22) Filed: Apr. 16, 2019

(65) Prior Publication Data

US 2019/0327390 A1 Oct. 24, 2019

(30) Foreign Application Priority Data

Apr. 18, 2018 (JP) ................................. 2018-080161

(51) Int. Cl.
*H04N 5/14* (2006.01)
*G06T 7/20* (2017.01)

(52) U.S. Cl.
CPC ............... *H04N 5/144* (2013.01); *G06T 7/20* (2013.01)

(58) Field of Classification Search
CPC . G06T 2207/10016; G06T 2207/20021; G06T 7/20; G06T 7/248; H04N 5/144; H04N 5/23218; H04N 5/23267
See application file for complete search history.

(56) References Cited

U.S. PATENT DOCUMENTS

| | | | | |
|---|---|---|---|---|
| 7,136,518 B2* | 11/2006 | Griffin | ................. | A61B 5/0059 382/133 |
| 8,213,679 B2* | 7/2012 | Yao | ......................... | G06T 7/246 382/103 |
| 8,330,818 B2* | 12/2012 | Cheng | ...................... | G06T 7/246 348/148 |
| 8,630,453 B2* | 1/2014 | Nishino | .................. | G06T 7/246 382/103 |
| 2006/0192857 A1* | 8/2006 | Kondo | ....................... | G06T 7/20 348/208.4 |

(Continued)

FOREIGN PATENT DOCUMENTS

| JP | 2007-334625 A | 12/2007 |
| JP | 2008-192060 A | 8/2008 |
| JP | 2012-073997 A | 4/2012 |

*Primary Examiner* — Amy R Hsu
(74) *Attorney, Agent, or Firm* — Cowan, Liebowitz & Latman, P.C.

(57) ABSTRACT

There is provided an image processing apparatus. A setting unit sets a first processing region in a part of a captured range. A selection unit selects a plurality of tracking target points in a first captured image of a plurality of captured images. A detection unit detects a motion vector of each tracking target point between the first captured image and a second captured image subsequently captured after the first captured image. A determination unit determines whether a moving object has appeared in the first processing region. A control unit performs control to iterate a first process set until it is determined that the moving object has appeared in the first processing region, and to iterate a second process set after it is determined that the moving object has appeared in the first processing region.

13 Claims, 10 Drawing Sheets

(56) References Cited

U.S. PATENT DOCUMENTS

| | | | | |
|---|---|---|---|---|
| 2009/0304234 | A1* | 12/2009 | Kondo | G06T 7/248 |
| | | | | 382/103 |
| 2011/0255748 | A1* | 10/2011 | Komoto | G06T 7/246 |
| | | | | 382/103 |
| 2013/0182935 | A1* | 7/2013 | Wang | A61B 6/503 |
| | | | | 382/133 |
| 2014/0211993 | A1* | 7/2014 | Ishii | G06T 7/246 |
| | | | | 382/103 |
| 2017/0134649 | A1* | 5/2017 | Wakamatsu | G06T 7/20 |
| 2017/0223272 | A1* | 8/2017 | Aoyama | H04N 5/23267 |
| 2018/0053301 | A1* | 2/2018 | Oshima | G06T 7/246 |
| 2018/0357772 | A1* | 12/2018 | Takemura | G06T 7/00 |

* cited by examiner

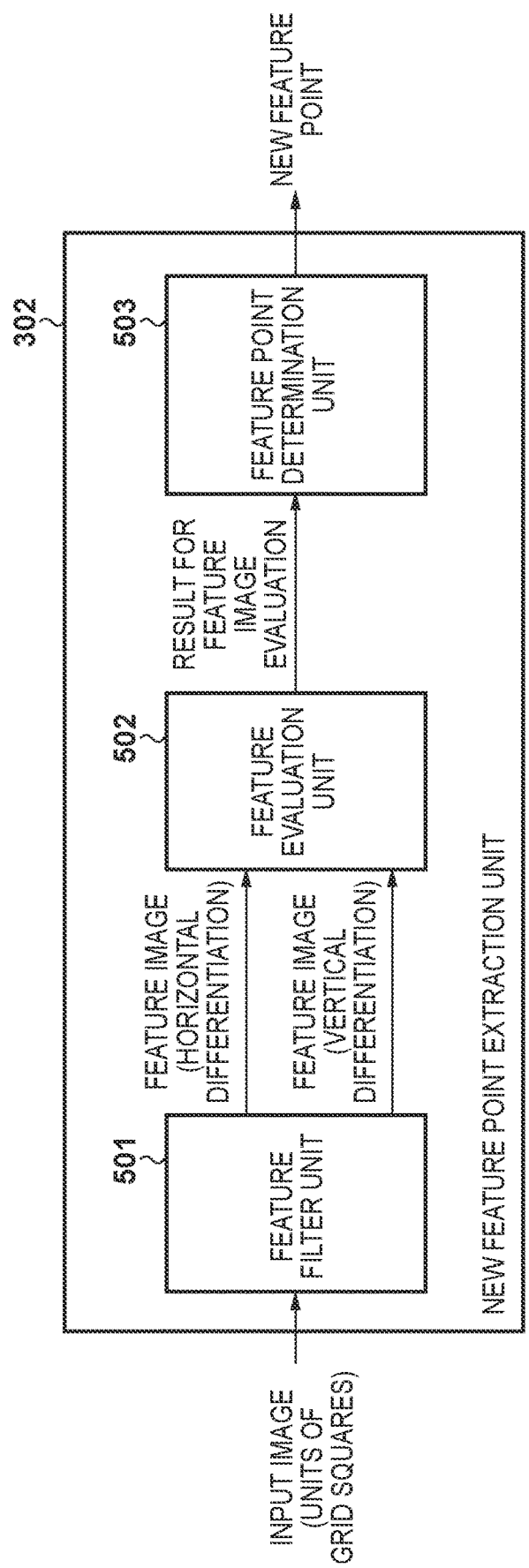

IMAGE PROCESSING APPARATUS, IMAGE CAPTURING APPARATUS, IMAGE PROCESSING METHOD, AND STORAGE MEDIUM

BACKGROUND OF THE INVENTION

Field of the Invention

The present invention relates to an image processing apparatus, an image capturing apparatus, an image processing method, and a storage medium.

Description of the Related Art

To perform camera-shake correction on a video captured with an image capturing apparatus such as a digital video camcorder, it is necessary to detect a movement amount between frame images to perform positioning of a plurality images. Examples of the method of detecting a movement amount between frame images include a method of using information from an external device such as a gyro sensor, and a method of estimating a movement amount from captured frame images.

Various methods of estimating a movement amount from frame images have been proposed, and a typical example of such methods is a motion vector detection based on template matching. In template matching, first, one of certain two frame images of a video is set as an original image, and the other is set as a reference image. Then, a rectangular region of a predetermined size disposed on the original image is set as a template block, and, at each position in the reference image, the correlations with the distribution of pixel values in the template block are determined. At this time, the position having the highest correlation in the reference image is the movement destination of the template block, and the direction and the movement amount to the movement destination with respect to the position in the template block on the original image are a motion vector.

A technique is known in which, to increase the detection efficiency of motion vectors, feature point are extracted from the frame image and the template block is disposed at the extracted feature points to perform template matching. In this case, when the feature point extraction is performed in the entire image, the distribution of the feature points tends to be non-uniform. In the case that motion vectors obtained for such non-uniform feature points are used for camera-shake correction, the camera-shake correction is mainly performed in a region in which features concentrate. In view of this, as disclosed in Japanese Patent Laid-Open No. 2008-192060, a technique is known in which, for the purpose of achieving uniform distribution of feature points, an image is divided into grid squares and a feature value that indicates the size of a feature is calculated for each pixel so as to extract a pixel having a greatest feature value in each grid square as a feature point.

In addition, as disclosed in Japanese Patent Laid-Open No. 2007-334625, a technique is known in which feature points are tracked for the purpose of increasing the detection efficiency of motion vectors. Feature point tracking can be achieved by detecting a motion vector of a feature point extracted from an image in a sequential manner in a plurality of successive frame images.

FIG. 10 schematically illustrates a feature point tracking process. An image capturing apparatus extracts a feature point 1001 in feature point extraction grid squares 1004 for feature point extraction, and sets a template region 1003. Then, the image capturing apparatus performs template matching in a template matching region 1006 to calculate a vector value 1007. Peripheral grid squares 1005, which are not used for feature point extraction but is used for template matching, are disposed around the feature point extraction grid squares 1004.

A process on the next frame includes, at the image capturing apparatus, performing template matching at and around a tracking destination feature point 1002 that is obtained by adding the calculated vector value 1007 to the feature point 1001. Thereafter, the image capturing apparatus repeats, for each of a plurality of frames, a process of adding the vector value to the tracking destination feature point to detect the feature point of the next tracking destination.

Also, as disclosed in Japanese Patent Laid-Open No. 2012-73997, a technique is known in which the tracking range is limited on the basis of the moving direction of the tracking target and the like.

Suppose that an image capturing apparatus using such a feature point tracking process is used to perform image capturing in a period before and after a timing of "frame-in" (the entrance of an object into the frame) of an object that is moving (moving object). In this case, before the frame-in of the moving object, only feature points having no relation with the moving object can be extracted by the image capturing apparatus. Accordingly, in the case that the feature point tracking process is started before the frame-in of the moving object, the image capturing apparatus keeps tracking of the feature points having no relation with the moving object even after the frame-in of the moving object. As a result, for example, a camera-shake correction that prioritizes moving objects cannot be performed.

SUMMARY OF THE INVENTION

In view of the foregoing, the present invention provides a technique capable of tracking a larger number of feature points corresponding to a frame-in moving object during image capturing.

According to a first aspect of the present invention, there is provided an image processing apparatus comprising one or more processors and a memory storing a program which, when executed by the one or more processors, causes the image processing apparatus to function as: a setting unit configured to set a first processing region in a part of a captured range; a selection unit configured to select a plurality of tracking target points in a first captured image of a plurality of captured images; a detection unit configured to detect a motion vector of each tracking target point between the first captured image and a second captured image subsequently captured after the first captured image; a determination unit configured to determine whether a moving object has appeared in the first processing region; and a control unit configured to perform control, for each of the plurality of captured images as the first captured image in an order in which the plurality of captured images are captured, to iterate a first process set including selecting by the selection unit, detecting by the detection unit, and determining by the determination unit until it is determined that the moving object has appeared in the first processing region, and to iterate a second process set including selecting by the selection unit and detecting by the detection unit after it is determined that the moving object has appeared in the first processing region, wherein in the first process set, the selection unit selects the plurality of tracking target points from the first processing region on a basis of the first processing region of the first captured image, and in the second process set, the selection unit selects, as the plurality of tracking target points for the second process set presently performed, a movement destination of each tracking target point indicated by the motion vector of each tracking target point detected in the second process set performed last time.

According to a second aspect of the present invention, there is provided an image processing apparatus comprising one or more processors and a memory storing a program which, when executed by the one or more processors, causes the image processing apparatus to function as: a setting unit configured to set a first processing region in a part of a captured range of an image capturing unit; a calculation unit configured to perform calculation of a feature point in the first processing region for a plurality of captured images sequentially captured by the image capturing unit; and a control unit configured to perform processing to iterate the calculation of the feature point in the first processing region for the plurality of captured images until a moving object is detected in the first processing region on a basis of the feature point, and in response to a detection of the moving object, to track the feature point that is calculated.

According to a third aspect of the present invention, there is provided an image processing method executed by an image processing apparatus, comprising: setting a first processing region in a part of a captured range; selecting a plurality of tracking target points in a first captured image of a plurality of captured images; detecting a motion vector of each tracking target point between the first captured image and a second captured image subsequently captured after the first captured image; determining whether a moving object has appeared in the first processing region; and performing control, for each of the plurality of captured images as the first captured image in an order in which the plurality of captured images are captured, to iterate a first process set including the selecting, the detecting, and the determining unit until it is determined that the moving object has appeared in the first processing region, and to iterate a second process set including the selecting and the detecting after it is determined that the moving object has appeared in the first processing region, wherein in the first process set, the plurality of tracking target points is selected from the first processing region on a basis of the first processing region of the first captured image, and in the second process set, a movement destination of each tracking target point, indicated by the motion vector of each tracking target point detected in the second process set performed last time, is selected as the plurality of tracking target points for the second process set presently performed.

According to a fourth aspect of the present invention, there is provided a non-transitory computer-readable storage medium which stores a program for causing a computer to execute an image processing method comprising: setting a first processing region in a part of a captured range; selecting a plurality of tracking target points in a first captured image of a plurality of captured images; detecting a motion vector of each tracking target point between the first captured image and a second captured image subsequently captured after the first captured image; determining whether a moving object has appeared in the first processing region; and performing control, for each of the plurality of captured images as the first captured image in an order in which the plurality of captured images are captured, to iterate a first process set including the selecting, the detecting, and the determining unit until it is determined that the moving object has appeared in the first processing region, and to iterate a second process set including the selecting and the detecting after it is determined that the moving object has appeared in the first processing region, wherein in the first process set, the plurality of tracking target points is selected from the first processing region on a basis of the first processing region of the first captured image, and in the second process set, a movement destination of each tracking target point, indicated by the motion vector of each tracking target point detected in the second process set performed last time, is selected as the plurality of tracking target points for the second process set presently performed.

Further features of the present invention will become apparent from the following description of exemplary embodiments with reference to the attached drawings.

BRIEF DESCRIPTION OF THE DRAWINGS

FIG. 5 is a block diagram illustrating a specific configuration of a new feature point extraction unit 302.

DESCRIPTION OF THE EMBODIMENTS

Figure 1:
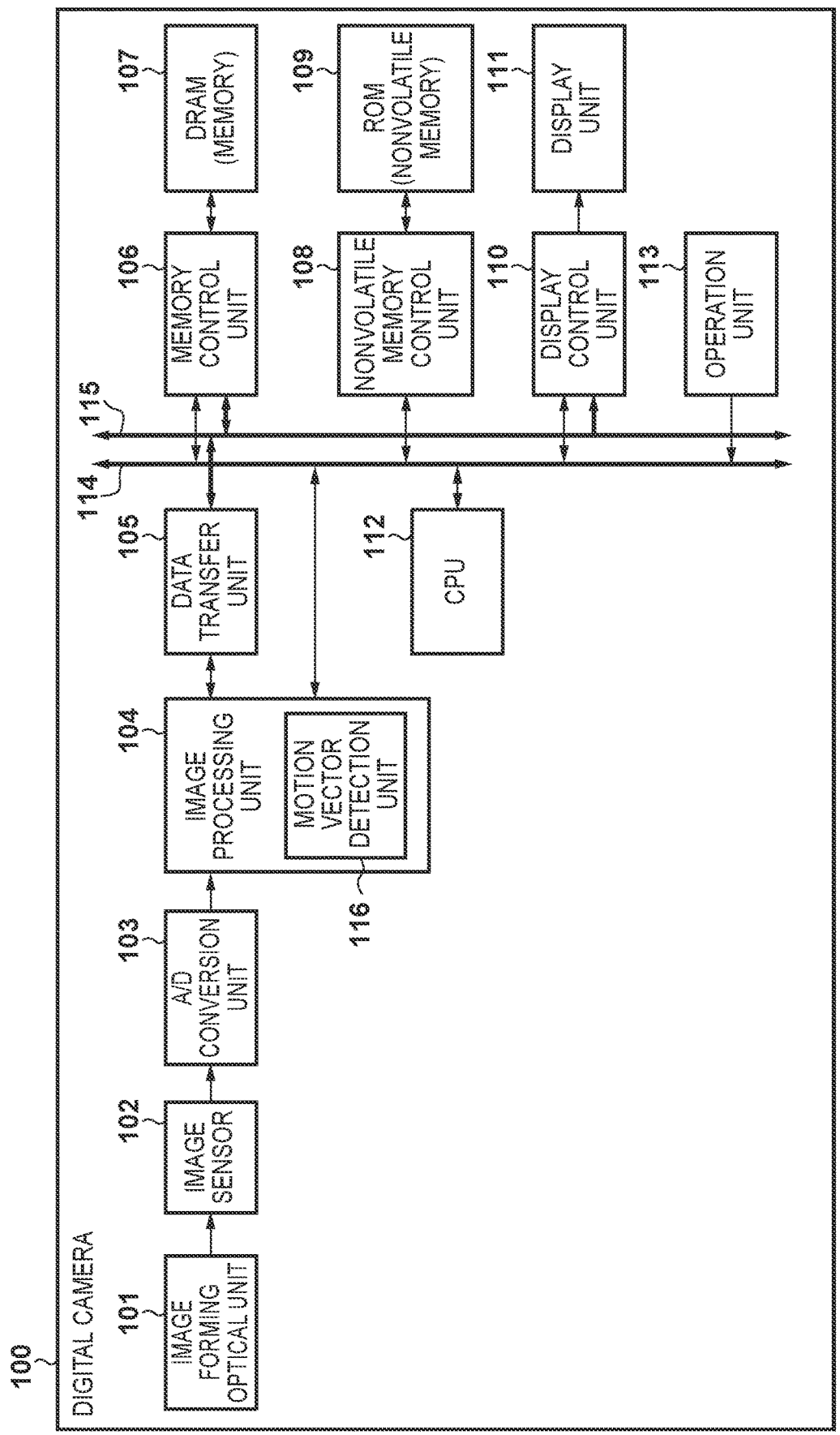
FIG. 1 is a block diagram illustrating a configuration of a digital camera 100 including an image processing apparatus.

Hereinafter, embodiments of the present invention will be described with reference to the attached drawings. Elements that are given the same reference numerals throughout all of the attached drawings represent the same or similar elements. Note that the technical scope of the present invention is defined by the claims, and is not limited by the following respective embodiments. Also, not all of the combinations of the aspects that are described in the embodiments are necessarily essential to the present invention. Also, the aspects that are described in the individual embodiments can be combined as appropriate.

First Embodiment

FIG. 1 is a block diagram illustrating a configuration of a digital camera 100 including an image processing apparatus. In FIG. 1, an image forming optical unit 101 includes a plurality of lens groups including a focus lens and an image stabilization lens, a diaphragm and the like. When capturing an image, the image forming optical unit 101 performs focus adjustment, exposure adjustment, shake correction and the like to form an optical image on an image sensor 102. The image sensor 102 is composed of a CCD, a CMOS sensor or the like and has a photoelectric conversion function for converting an optical image into an electric signal (analog image signal). An A/D conversion unit 103 converts an analog image signal from the image sensor 102 into a digital image signal.

A CPU 112 is composed of a microcomputer or the like for managing the entire control of the digital camera 100, and provides instructions to each function block to execute various control processes. A bus 114 is a system bus and a bus 115 is an image data bus.

A DRAM 107 is a memory for storing data, and has a storage capacity enough for storing data such as a predetermined number of still images, and a video and a sound of a predetermined time and the like, a constant for an operation of the CPU 112, a program and the like. A memory control unit 106 performs data writing to and data reading from the DRAM 107 in response to an instruction from the CPU 112 or a data transfer unit 105.

A nonvolatile memory control unit 108 performs data writing to and reading from a ROM 109 in response to an instruction from the CPU 112. The ROM 109 is a memory that is electrically erasable and recordable, and is an EEPROM or the like. The ROM 109 stores a constant for an operation of the CPU 112, a program and the like.

Via the bus 114, the CPU 112 controls an image processing unit 104, the data transfer unit 105, the memory control unit 106, the nonvolatile memory control unit 108, a display control unit 110, an operation unit 113 and the image sensor 102. The CPU 112 implements processes according to the present embodiment by executing programs stored in the ROM 109.

A display unit 111 is composed of a liquid crystal monitor and the like, and is controlled by the display control unit 110 to display various kinds of image data and the like. The operation unit 113 includes a switch, a button, a touch panel and the like to be operated by the user, and is used for operations such as ON/OFF of the power and ON/OFF of the shutter.

The image processing unit 104 is composed of an image processing circuit, a buffer memory and the like of various kinds, and includes a motion vector detection unit 116.

The data transfer unit 105 is composed of a plurality of direct memory access controllers (DMAC) for performing data transfer.

Figure 2:
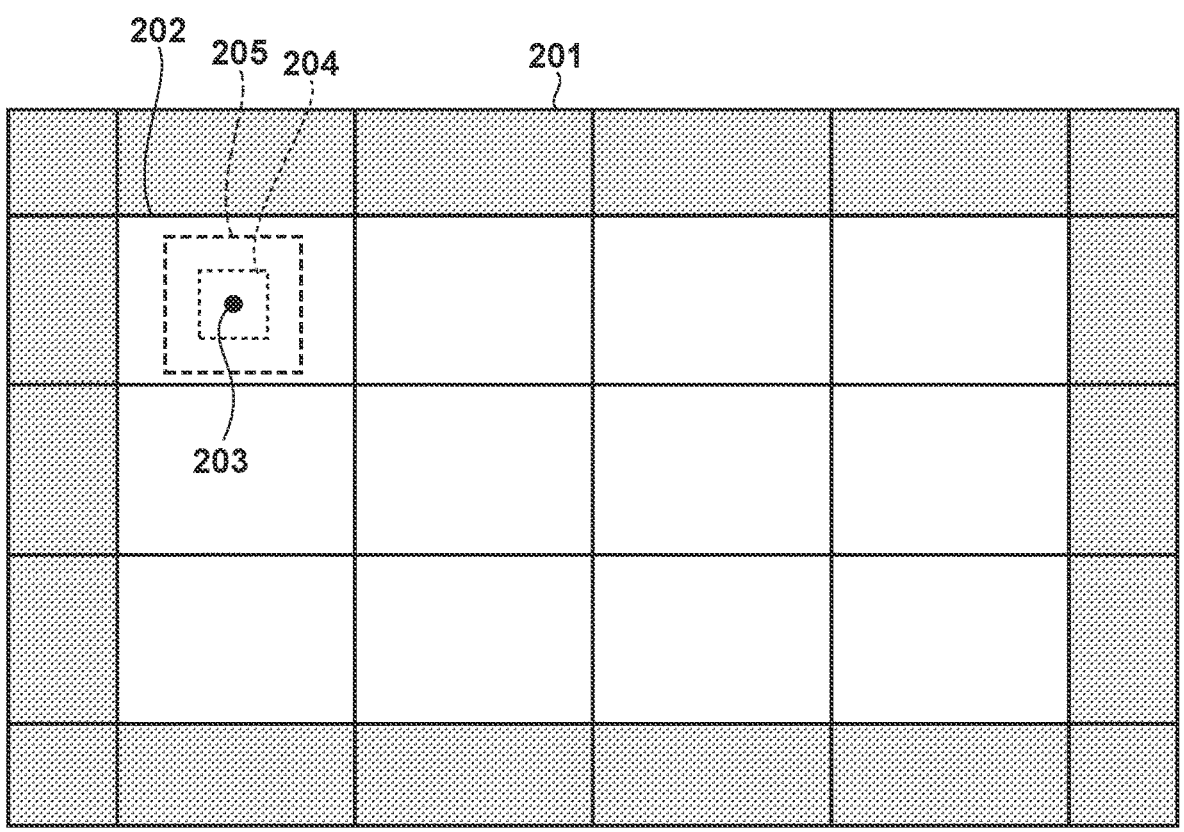
FIG. 2 illustrates a relationship between a grid square pattern, a feature point, a template region and the like that are processed by a motion vector detection unit 116.

FIG. 2 illustrates a relationship between a grid square pattern, a feature point, a template region and the like that are processed by the motion vector detection unit 116.

A feature point extraction grid square 202 (the white grid square in FIG. 2) and peripheral grid squares 201 (the dotted grid square in FIG. 2) having predetermined sizes are disposed with a predetermined number of grid squares in the horizontal and vertical directions. One feature point 203 is extracted in each grid square of the feature point extraction grid squares 202. The peripheral grid squares 201 form a region disposed around the feature point extraction grid squares 202, and are used for template matching although the feature point extraction is not performed in the peripheral grid squares 201. A search region 205 and a template region 204 having rectangular shapes of predetermined sizes are provided around the extracted feature point 203 located at the center.

Figure 3:
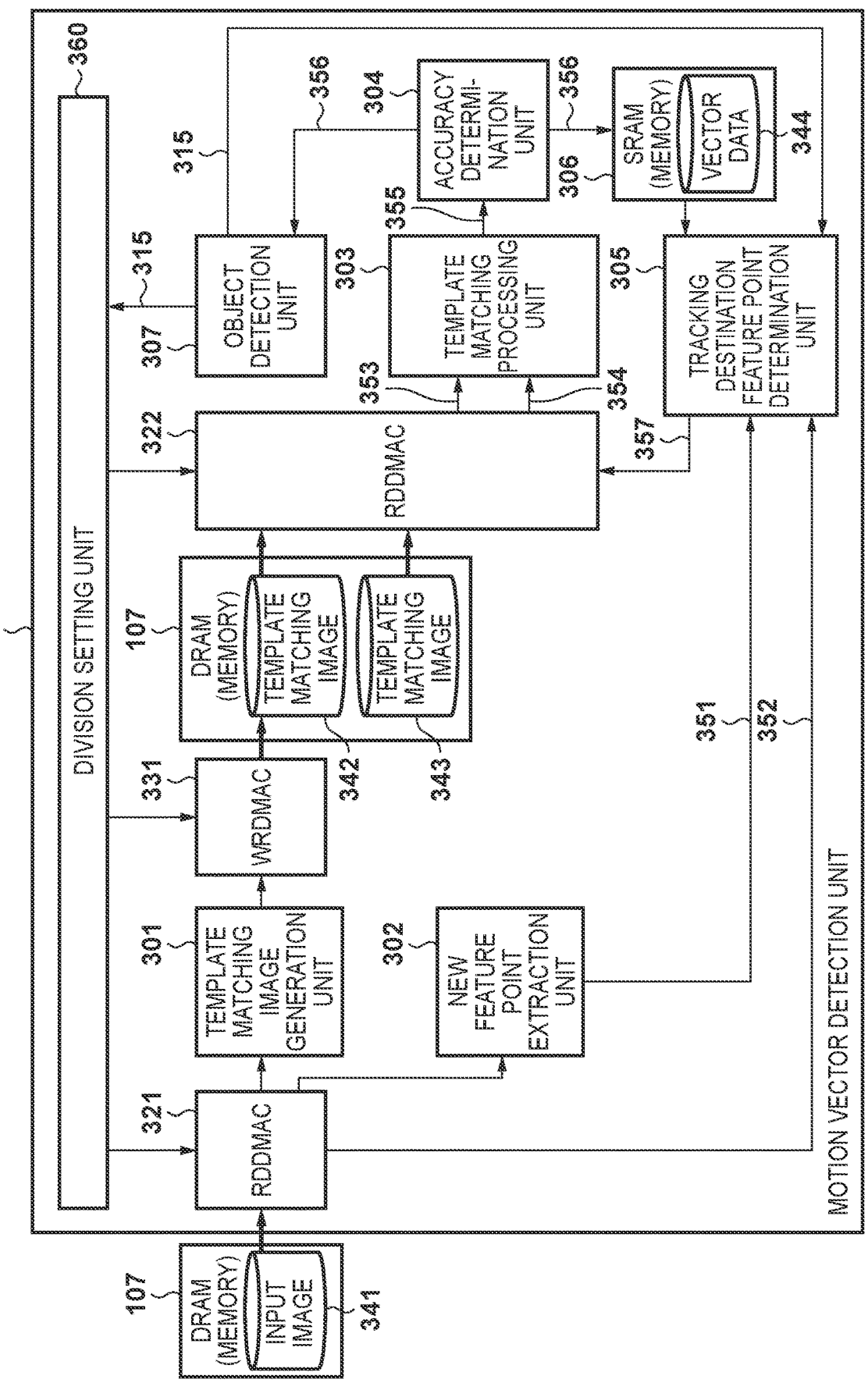
FIG. 3 is a block diagram illustrating a configuration of the motion vector detection unit 116.
Figure 4:
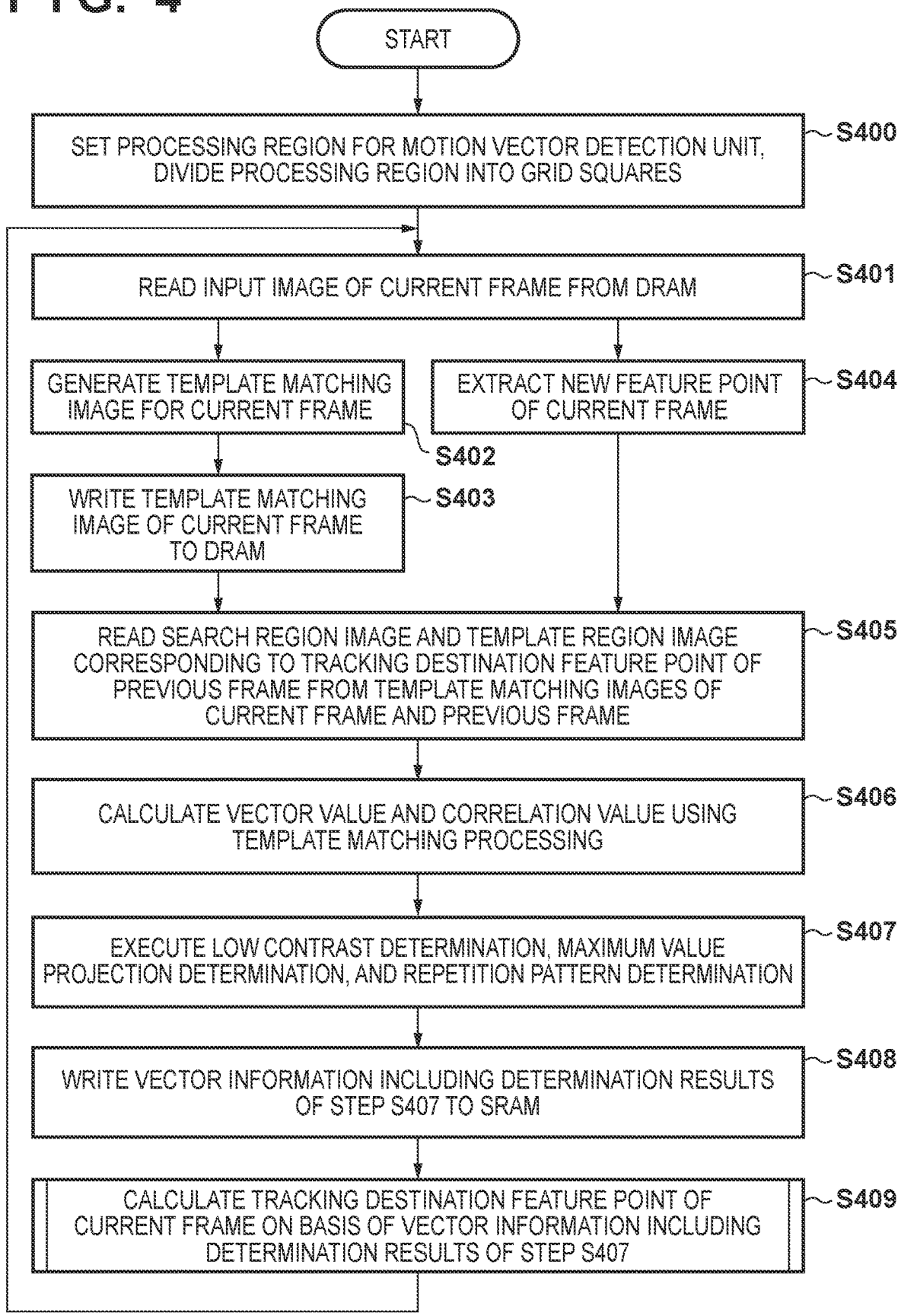
FIG. 4 is a flowchart of a feature point tracking process.

Next, a feature point tracking process is described with reference to FIGS. 3 and 4. FIG. 3 is a block diagram illustrating a configuration of the motion vector detection unit 116, and FIG. 4 is a flowchart of a feature point tracking process. For convenience of description, in FIG. 3, blocks that are not included in the motion vector detection unit 116 in practice but are used for the feature point tracking process (e.g. the DRAM 107) are illustrated inside the motion vector detection unit 116. In addition, for easy understanding of data flow, the same block (e.g. the DRAM 107) may be illustrated at a plurality of locations. When input of a captured image to the image processing unit 104 is started, the process of the flowchart of FIG. 4 is executed.

At S400, on the basis of information from the operation unit 113 and a program, the CPU 112 sets a processing region to be subjected to a feature point extraction process (described later) in a captured range, and sets the set processing region in a division setting unit 360 of the motion vector detection unit 116. The division setting unit 360 divides the set processing region into grid squares such as those illustrated in FIG. 2, for example.

At S401, an RDDMAC 321 included in the data transfer unit 105 reads an input image 341 of a current frame as a vector detection target from the DRAM 107 via the bus 115. The amount of the data to be read corresponds to the sizes of the feature point extraction grid squares 202 and the peripheral grid squares 201 set at S400 as illustrated in FIG. 2, for example. Note that various image processes have already been performed on the input image 341 in the image processing unit 104. The input image 341 read by the RDDMAC 321 for each grid square is output to a template matching image generation unit 301 and a new feature point extraction unit 302. In addition, the RDDMAC 321 outputs grid square coordinate information 352 representing the coordinate position of the read grid square to a tracking destination feature point determination unit 305.

At S402, the template matching image generation unit 301 generates a template matching image used for template matching in vector detection, and outputs the image to a WRDMAC 331 of the data transfer unit 105. The template matching image generation unit 301 includes a band-pass filter circuit, and removes high-frequency components and low-frequency components of an image signal that are unnecessary to the template matching process.

At S403, the WRDMAC 331 of the data transfer unit 105 writes an input template matching image (hereinafter referred to as a template matching image 342) to the DRAM 107 via the bus 115. In addition, in the DRAM 107, a template matching image generated in a previous frame (hereinafter referred to as a template matching image 343) is stored.

At S404, the new feature point extraction unit 302 extracts a new feature point of the current frame (new tracking target point). Note that, the process of S404 can be executed in parallel with the processes of S402 and S403.

Now, with reference to FIG. 5, details of the new feature point extraction unit 302 are described. The new feature point extraction unit 302 includes a feature filter unit 501, a feature evaluation unit 502 and a feature point determination unit 503.

The feature filter unit 501 is composed of a plurality of filters including a band pass filter, a horizontal differential filter, a vertical differential filter and a smoothing filter. In the present embodiment, the band pass filter removes unnecessary high-frequency components and low-frequency components of an input image (for each grid square). Thereafter, a signal on which horizontal differential filtering has been performed by the horizontal differential filtering and a signal on which vertical differential filtering has been performed by the vertical differential filtering are generated. Smoothing filtering is performed by the smoothing filter on the signals on which the differential filter processing of each direction has been performed. The feature filter unit 501 outputs each of the signals obtained in the above-mentioned manner as a feature image of each direction.

In the feature images (for each grid square) on which filtering has been performed by the feature filter unit 501, the feature evaluation unit 502 calculates, as a feature value, a point having a large derivative value around a pixel in multiple directions, such as an intersection of two edges and a point on a curve where the curvature is locally maximal, by a feature evaluation equation for each pixel. Calculation of a feature value is described below using a method of Shi and Tomasi, for example. The feature evaluation unit 502 creates an autocorrelation matrix H expressed in Equation 1 from results obtained by horizontal differential filtering and vertical differential filtering.

$$H = G * \begin{pmatrix} Ix^2 & IxIy \\ IxIy & Iy^2 \end{pmatrix} \quad (1)$$

In Equation 1, Ix represents a result obtained by horizontal differential filtering and Iy represents a result obtained by vertical differential filtering, and, a convolution operation of a Gaussian filter G is performed. Equation 2 is a feature evaluation equation of Shi and Tomasi.

$$\text{Shi and Tomasi} = \min(\lambda 1, \lambda 2) \quad (2)$$

Equation 2 indicates that the feature value is the smaller one of eigen values λ1 and λ2 of the autocorrelation matrix H of Equation 1.

The feature point determination unit 503 determines (selects), as a feature point, a pixel having a largest feature value Pc in the feature values of the pixels calculated by the feature evaluation unit 502 for each grid square (in the region subjected to the selection of the feature point). While the coordinates of a feature point is represented by relative coordinates (PX, PY) in which a left upper end of the grid square is set to (0, 0) in the present embodiment, the coordinates of a feature point may be represented by absolute coordinates in an image signal.

Note that coordinates (PX, PY) of an extracted new feature point is stored in a memory of the new feature point extraction unit 302. The memory has a capacity for storing coordinates (PX, PY) of feature points of a previous frame and a current frame. A new feature point 351 is output to the tracking destination feature point determination unit 305 when a template matching process of a corresponding grid square is started in a template matching processing unit 303.

At S405, an RDDMAC 322 reads a rectangular region of a predetermined size from the template matching image 342 of the current frame and the template matching image 343 of the previous frame, with a tracking destination feature point 357 calculated in the previous frame located at the center. The tracking destination feature point 357 is input from the tracking destination feature point determination unit 305. It should be noted that, when the template matching process is performed for the first time, no tracking destination feature point is calculated in the previous frame, and therefore the new feature point 351 of the previous frame is used instead of the tracking destination feature point 357. The new feature point 351 of the previous frame is used instead of the tracking destination feature point 357 also under certain circumstances described later.

Note that, the rectangular region that is read from the template matching image 342 of the current frame corresponds to the search region 205, and the rectangular region that is read from the template matching image 343 of the previous frame corresponds to the template region 204. An image of the rectangular region corresponding to the search region 205 and an image corresponding to the template region 204 are output to the template matching processing unit 303 as a search region image 353 and a template region image 354, respectively.

At S406, the template matching processing unit 303 calculates a correlation value by using the search region image 353 and the template region image 354, and calculates a vector value on the basis of the correlation value. In the present embodiment, as a method of calculating the correlation value, a sum of absolute difference (SAD) of Equation 3 may be used.

$$S\_SAD = \Sigma_i \Sigma_j |f(i,j) - g(i,j)| \quad (3)$$

In Equation 3, f (i, j) represents a pixel value in coordinates (i, j) in the template region image 354, and g (i, j) represents a corresponding pixel value in a region to be subjected to a correlation value calculation in the search region image 353. The size of the region to be subjected to the correlation value calculation is equal to that of the template region image 354. In SAD, a correlation value S_SAD can be obtained by calculating the absolute value of the difference between the pixel values f (i, j) and g (i, j) in the both blocks and by determining the sum total. This indicates that the smaller the correlation value S_SAD, the smaller the luminance value difference between the both blocks, or in other words, the textures are more similar to each other between the template region image 354 and the correlation value calculation region.

While SAD is used as an example of the correlation value in the present embodiment, this is not limitative, and other correlation values such as sum of squared difference (SSD) and normalized cross-correction (NCC) may also be used. The template matching processing unit 303 calculates a vector value of the tracking destination feature point of the previous frame on the basis of the position of the minimum value of the correlation value. The template matching processing unit 303 outputs vector information 355 (the calculated vector value and correlation value) to an accuracy determination unit 304.

At S407, the accuracy determination unit 304 calculates a maximum value, a minimum value, an average value, and a local minima of the correlation value on the basis of the correlation value calculated at S406, and performs a low contrast determination, a maximum pixel value projection determination and a repetition pattern determination.

FIGS. 6A to 6D are graphs illustrating relationships between a pixel value and each determination. It should be noted that, since the smaller the correlation value, the higher the similarity in the present embodiment, the maximum value of the pixel value represents the minimum value in the correlation value, the minimum value of the pixel value represents the maximum value in the correlation value, and the local maxima of the pixel value represents the local minima in the correlation value in FIGS. 6A to 6D.

In the low contrast determination, when the difference between the maximum value and the minimum value of the correlation value in the correlation value calculation region is smaller than a predetermined threshold, it is determined that the correlation value calculation region is low contrast. In the maximum pixel value projection determination, the degree of the minimum value of the correlation value in the correlation value calculation region is determined. When a value obtained by division of the difference between the maximum value and the average value of the pixel value and the difference between the maximum value and the minimum value of the pixel value is smaller than a predetermined threshold, it is determined that the correlation value calculation region is low peak. When the value obtained by the division is greater than a threshold, it is determined that the correlation value calculation region is high peak. In the repetition pattern determination, when the difference between the minimum value and the local minima of the pixel value in the correlation value calculation region is smaller than a predetermined threshold, it is determined that the correlation value calculation region is a repetition pattern.

Figure 6A:
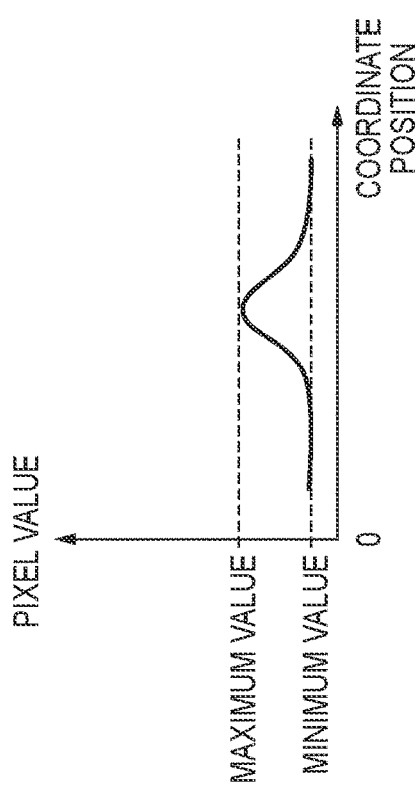
FIGS. 6A to 6D are explanatory views of a low contrast determination, a maximum pixel value projection determination and a repetition pattern determination.
Figure 6B:
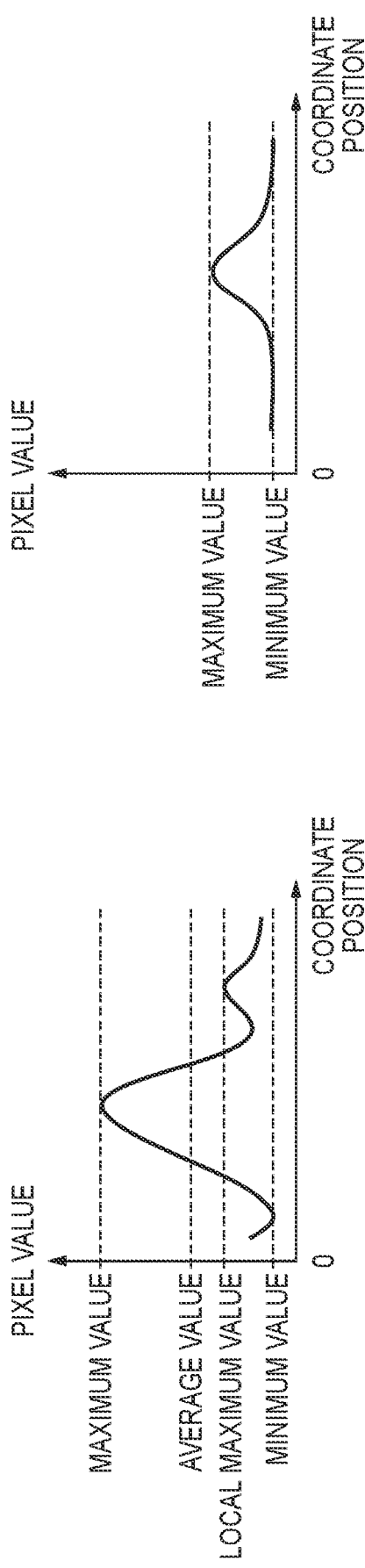
Figure 6C:
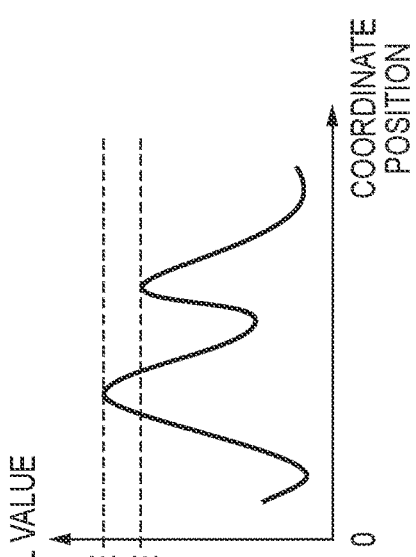
Figure 6D:
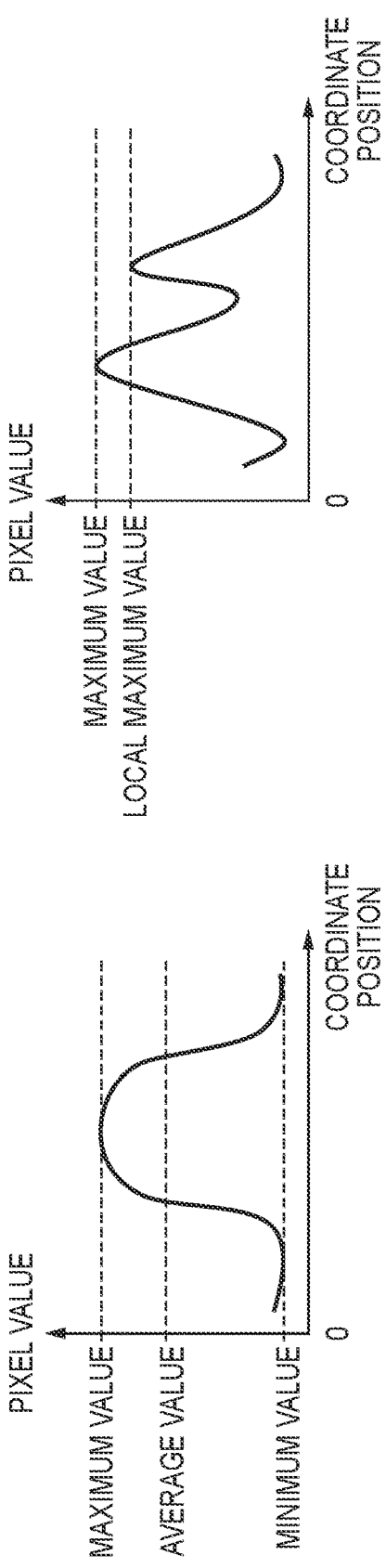

FIG. 6A illustrates a case that a favorable result is obtained in each determination. FIG. 6B illustrates a case that it is determined that the correlation value calculation region is low contrast in the low contrast determination. In FIG. 6B, the difference between the maximum value and the minimum value of the pixel value is smaller than in FIG. 6A. FIG. 6C illustrates a case that it is determined that the correlation value calculation region is low peak in the maximum pixel value projection determination. In FIG. 6C, a value obtained by the division of the difference between the maximum value and the average value of the pixel value and the difference between the maximum value and the minimum value of the pixel value is smaller than in FIG. 6A. FIG. 6D illustrates a case that it is determined that the correlation value calculation region is a repetition pattern in the repetition pattern determination. In FIG. 6D, the difference between the maximum value and the local maxima of the pixel value is smaller than in FIG. 6A.

At S408, the accuracy determination unit 304 outputs, to an SRAM 306, vector information 356 including determination results of the low contrast determination, the maximum value projection determination, and the repetition pattern determination. The vector information 356 is stored in the SRAM 306 as vector data 344.

At S409, the tracking destination feature point determination unit 305 calculates the tracking destination feature point of the current frame for use in the template matching process of the next frame on the basis of the vector data 344 and the tracking destination feature point 357 of the previous frame. The tracking destination feature point thus calculated is used as the tracking destination feature point 357 of the previous frame when the template matching process is executed at S405 in the next iteration. Details of the process of S409 are described later with reference to FIG. 7.

Through the above-mentioned processes, the template matching process of the current frame (i.e. the process of tracking the feature point of the previous frame in the current frame) is completed. Thereafter, when a captured image of the next frame is input to the image processing unit 104, the processes of S401 to S409 are again performed on the image of the next frame as the image of the current frame. Accordingly, in FIG. 4, the process of tracking the feature point is performed for one or more captured images captured after a predetermined captured image (e.g. a first captured image) serving as a reference image.

Figure 7:
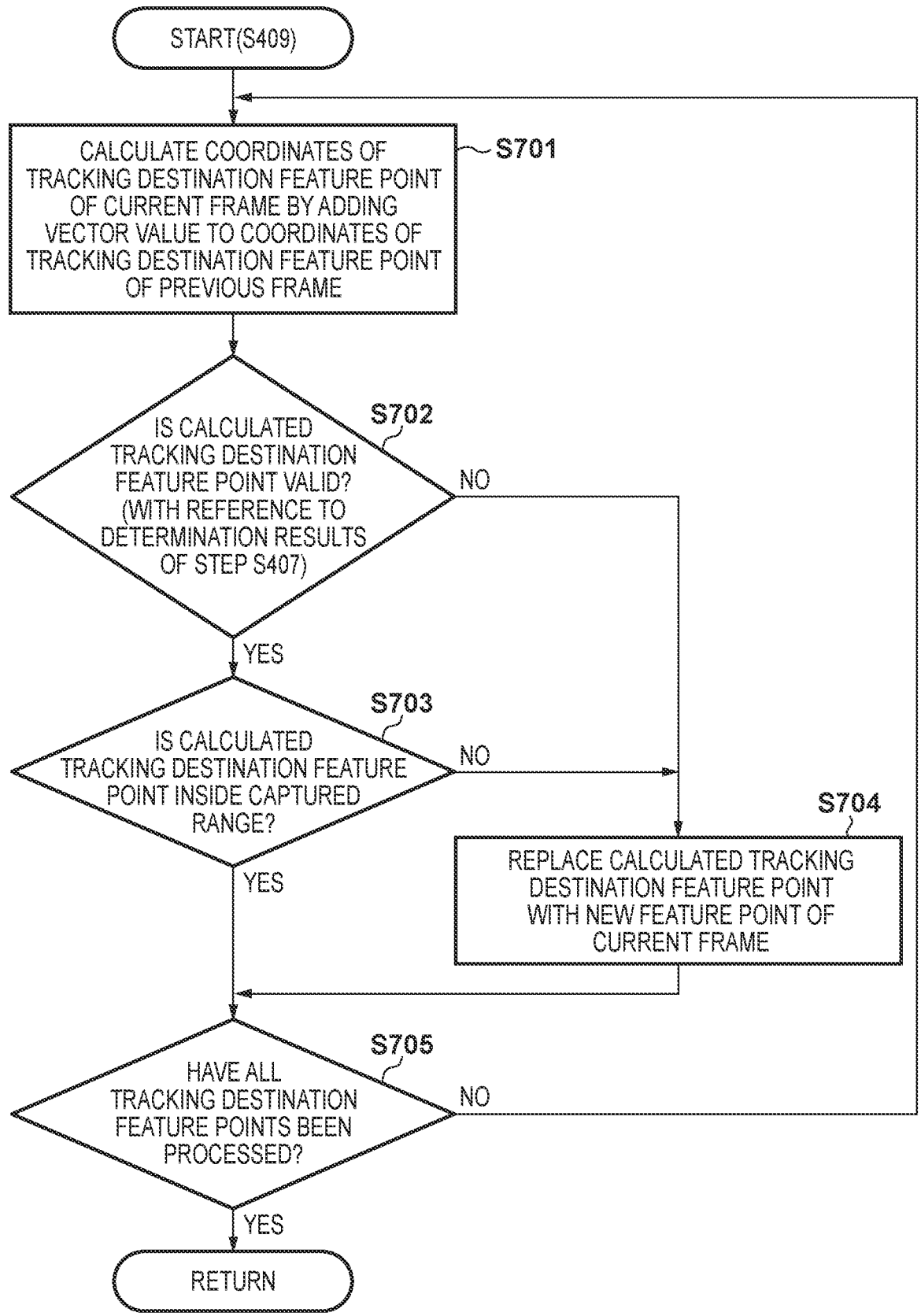
FIG. 7 is a flowchart illustrating details of a tracking destination feature point calculation process (at S409 in FIG. 4).

Next, details of the process of S409 are described with reference to FIG. 7. At S701, the tracking destination feature point determination unit 305 acquires the vector data 344 from the SRAM 306. Then, the tracking destination feature point determination unit 305 calculates the coordinates of the tracking destination feature point of the current frame by adding a vector value represented by the vector data 344 to the coordinates of the tracking destination feature point 357 of the previous frame. Note that the processes of S701 and subsequent S702 to S705 are performed for each tracking destination feature point.

At S702, the tracking destination feature point determination unit 305 determines whether the tracking destination feature point calculated at S701 is valid (whether it can be used for the template matching process of the next frame) on the basis of the determination result (the determination result of S407) included in the vector data 344. When it is determined that the correlation value calculation region is low contrast in the low contrast determination, it is determined that the tracking destination feature point is invalid. In addition, when it is determined that the correlation value calculation region is low peak in the maximum value projection determination and when it is determined that the correlation value calculation region is a repetition pattern in the repetition pattern determination, it is determined that the tracking destination feature point is invalid. In other cases, it is determined that the tracking destination feature point is valid. When the tracking destination feature point is valid, the process proceeds to S703, and when the tracking destination feature point is invalid, the process proceeds to S704.

At S703, the tracking destination feature point determination unit 305 determines whether the tracking destination feature point calculated at S701 is included inside the captured range. When the tracking destination feature point calculated at S701 is included in inside the captured range, the process proceeds to S705; otherwise, the process proceeds to S704.

At S704, the tracking destination feature point determination unit 305 replaces the tracking destination feature point calculated at S701 with the new feature point of the current frame calculated at S404 in FIG. 4. That is, in the case of "NO" at S702 or S703, the tracking destination feature point determination unit 305 determines that tracking of the feature point has been failed, and selects a new feature point for replacing the tracking destination feature point of the previous frame in the current frame. At this time, from among a plurality of new feature points calculated at S404, the tracking destination feature point determination unit 305 selects, as the new feature point for replacing the feature point failed in tracking, a new feature point calculated in the feature point extraction grid square where the feature point failed in tracking is first calculated. Suppose that tracking of a certain feature point calculated in a certain feature point extraction grid square of a first captured image is failed in a certain succeeding captured image, for example. In this case, the certain feature point failed in tracking is replaced with the new feature point calculated in the certain feature point extraction grid square through the process of S404 using the certain captured image as the current frame.

At S705, the tracking destination feature point determination unit 305 determines whether all the tracking destination feature points have been processed. When all the tracking destination feature points have been processed, the processes of this flowchart are completed. When there is an unprocessed tracking destination feature point, the processes after S701 are performed in the same manner for the next unprocessed tracking destination feature point.

Next, a feature point tracking process that can be used for camera-shake correction for image capturing in a period before and after frame-in of a moving object is described with reference to FIGS. 8A to 8E and FIG. 9. In this period, a plurality of capture images are sequentially captured by the image sensor 102.

FIGS. 8A to 8E are time-series schematic views illustrating a process of the motion vector detection unit 116 for capturing a scene of frame-in of a moving object into a certain region in a captured range. FIG. 9 is a flowchart of a process of the motion vector detection unit 116 for a scene such as that illustrated in FIGS. 8A to 8E.

At S901, when taking a scene of frame-in of a moving object such as that illustrated in FIGS. 8A to 8E, a user performs an operation of setting a capturing mode of prioritizing image stabilization of the moving object by using the operation unit 113. In response to the user operation, the CPU 112 sets the capturing mode of prioritizing image stabilization of the moving object.

Figure 8A:
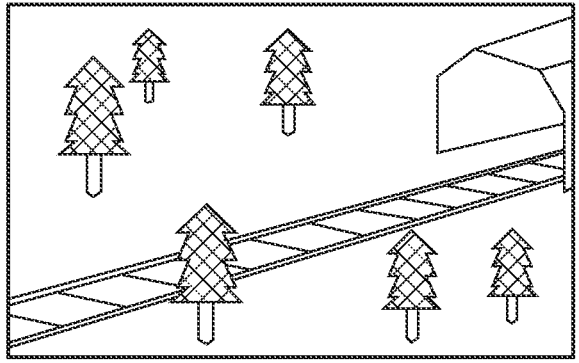
FIGS. 8A to 8E are schematic time-series views illustrating a process of the motion vector detection unit 116 for capturing a scene of frame-in of a moving object into a certain region in a captured range.
Figure 8B:
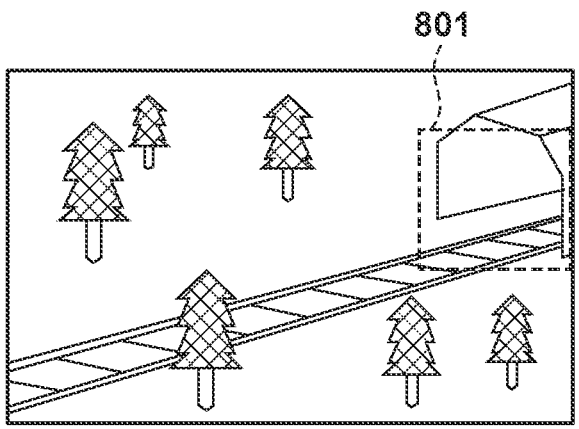
Figure 9:
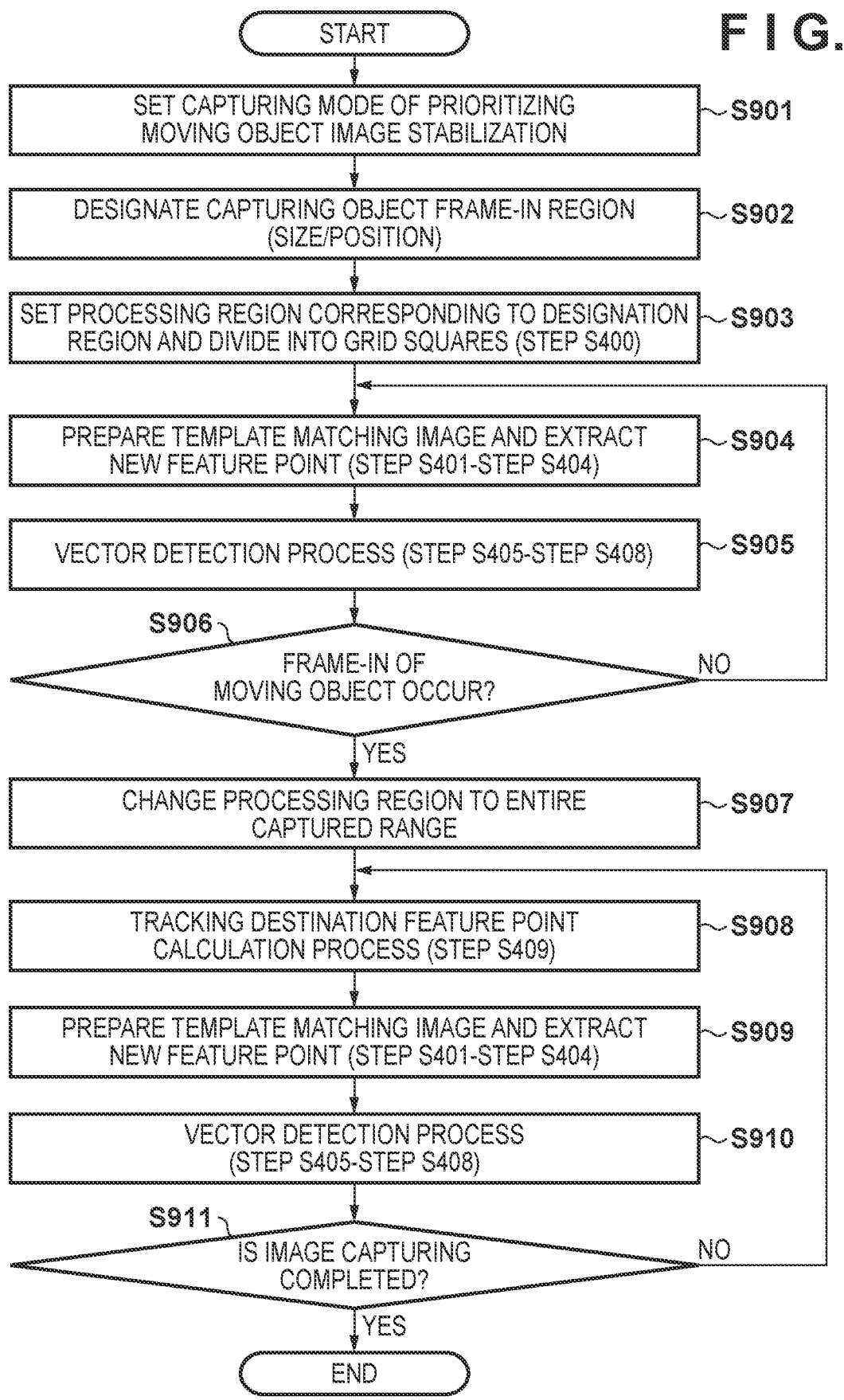
FIG. 9 is a flowchart of a process of the motion vector detection unit 116 for a scene such as that illustrated in FIGS. 8A to 8E.
Figure 10:
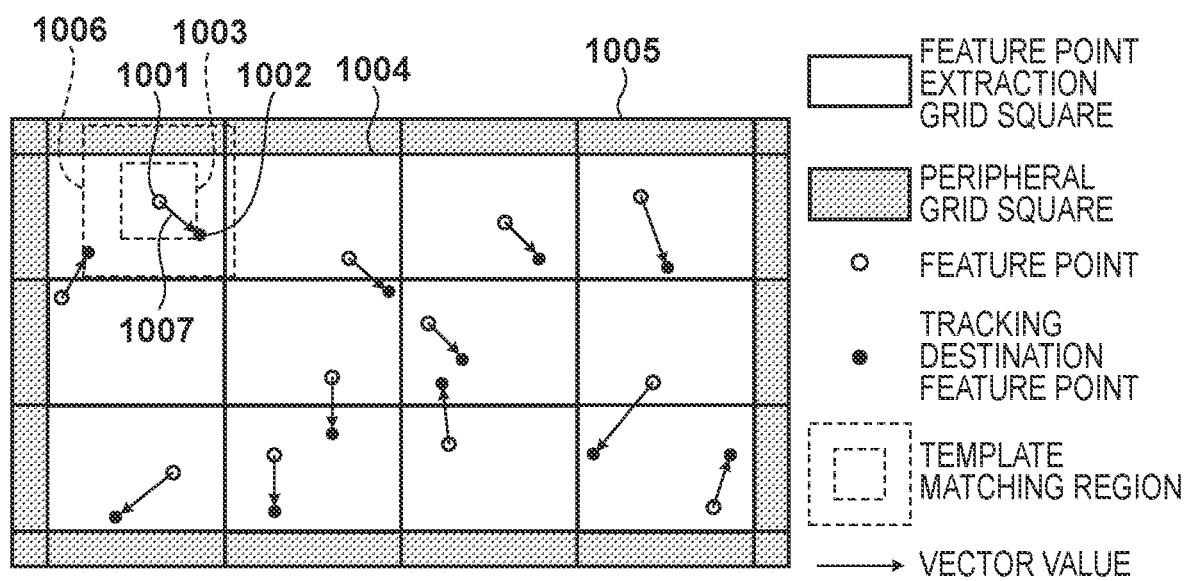
FIG. 10 schematically illustrates a feature point tracking process.

At S902, by using the operation unit 113, the user designates a capturing object frame-in region 801 such as that illustrated in FIG. 8B, for example. The capturing object frame-in region 801 is a region where frame-in of the moving object is expected by the user, and is a part of the captured range. At this time, the user designates the horizontal/vertical size and position of the rectangular region. The designation at the operation unit 113 may be achieved with a touch panel, or a button such as a direction key. As is clear from FIG. 8B, the designation of the capturing object frame-in region 801 can be executed while the capturing image is displayed.

Figure 8C:
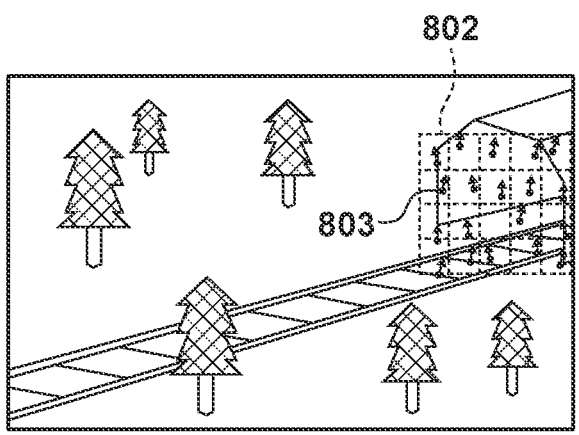

The process at S903 corresponds to a case that, at S400 of FIG. 4, the processing region corresponds to the designation region of S902. Specifically, the CPU 112 sets the processing region corresponding to the designation region at S902 in the division setting unit 360, and the division setting unit 360 divides the processing region into grid squares (divisional regions) on the basis of a grid square dividing number set in advance. As a result, a divided processing region 802 to be processed by the motion vector detection unit 116 as illustrated in FIG. 8C is set. For example, the grid square dividing number in the horizontal and vertical directions is automatically set in accordance with an input by the user, and for example, the grid square dividing number is set to a large value in the direction in which the size is large. Note that, here, only the feature point extraction grid squares 202 is illustrated for the divided processing region 802, and illustration of the peripheral grid squares 201 is omitted.

At S904, in accordance with the processes of S401 to S404 in FIG. 4, the motion vector detection unit 116 prepares a template matching image and extracts (selects) a new feature point in each grid square (the divided processing region 802).

At S905, in accordance with the processes of S405 to S408 in FIG. 4, the motion vector detection unit 116 performs a vector detection process relating to a feature point of the base frame between a base frame (first captured image) and a frame subsequently captured after the base frame (second captured image). Note that, the vector detection process at S905 includes, at the accuracy determination unit 304, outputting the vector information 356 not only to the SRAM 306 but also to an object detection unit 307. In addition, the vector detection process at S905 does not include performing the tracking destination feature point calculation process (S409 in FIG. 4). Accordingly, when the process is returned to S904 from S906 described later, the vector detection process relating to the new feature point 351 output by the new feature point extraction unit 302 is performed also on the next frame. With this configuration, before frame-in of a moving object, background image stabilization based on vector information of the background is performed.

Figure 8D:
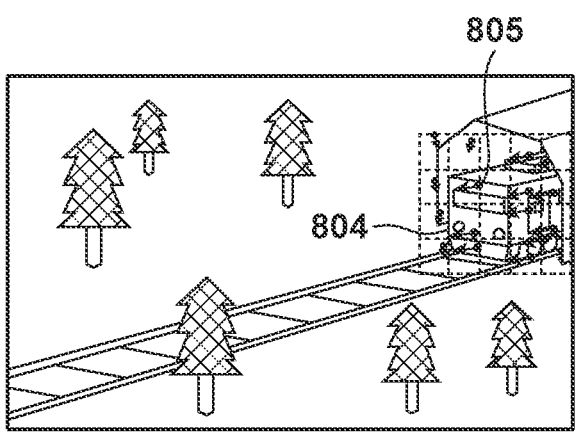

At S906, the object detection unit 307 determines whether frame-in (appearance) of a moving object into the capturing object frame-in region 801 has occurred on the basis of the vector information 356 output by the accuracy determination unit 304. As illustrated in FIG. 8C, before frame-in of a moving object, vector information 803 of the background, that is, a camera-shake component due to capturing by the user is predominantly acquired as vector information. When frame-in of a moving object 804 occurs as illustrated in FIG. 8D, vector information 805 of the moving object 804 is acquired. The vector information 805 of the moving object 804 tends to have a value larger than that of the vector information 803 of the background, and tends to be aligned in the same direction. The object detection unit 307 detects frame-in of a moving object by detecting switching from a frame in which the vector information 803 of the background is predominant to a frame in which the vector information 805 of the moving object 804 is predominant. A detection result 315 obtained by the object detection unit 307 is output to the division setting unit 360 and the tracking destination feature point determination unit 305. When frame-in of a moving object is detected at S906, the process proceeds to S907.

When frame-in of a moving object is not detected at S906, the process is returned to step S904, and the processes of S904 to S906 are performed on the next frame. That is, until it is determined that frame-in of a moving object has occurred, the digital camera 100 iterates the processes of S904 to S906 (first process set) on each of the plurality of captured images as a base frame in the order in which the images are captured. In the iterated processes, the feature point of the tracking target (vector detection target) in each vector detection process (S905) is a feature point extracted (selected) anew for each grid square on the basis of the processing region of the base frame. In addition, the determination at S906 is performed based on the difference between the motion vector of each feature point detected in the last iteration and the motion vector of each feature point detected in the current iteration. Note that, in the processing of the first frame, there is no vector information of the previous frame for comparison, and therefore the process is returned to step S904 without performing the determination of S906. Further, the digital camera 100 may perform the determination of S906 by a method that does not use motion vectors (e.g. an image recognition process).

Figure 8E:
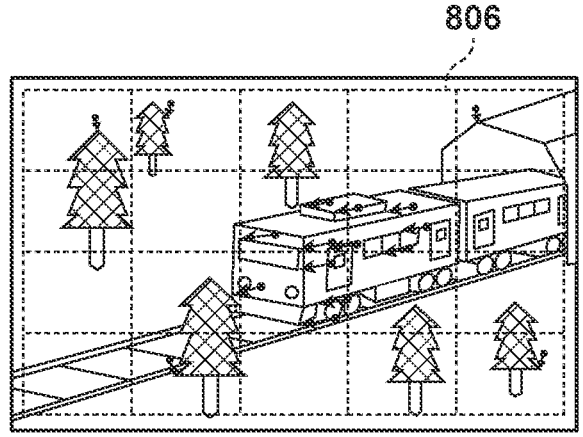

At S907, as illustrated in FIG. 8E, the division setting unit 360 divides the processing region of the motion vector detection unit 116 into grid squares in an enlarged manner over the entire captured range. In this manner, a divided processing region 806 is set. The grid square dividing number of the processing region is determined in advance in accordance with the processing capacity, and is therefore not changed by the enlargement. In addition, here, only the feature point extraction grid squares 202 is illustrated for the divided processing region 806, and illustration of the peripheral grid squares 201 is omitted. Note that the processing region set anew at S907 may be set in a part of the captured range, not the entire captured range as long as the processing region set anew at S907 is larger than the processing region set at S903.

At S908, the motion vector detection unit 116 determines the tracking destination feature point 357 in accordance with the process of S409. Note that, since the divided processing region 806 is set in the entire captured range (the entire screen), the new feature point employed at S704 in the case that tracking of the feature point has been failed (NO at S702 or S703 in FIG. 7) is selected from the points extracted from the entire screen.

At S909, the motion vector detection unit 116 prepares a template matching image and extracts a new feature point in each grid square (the divided processing region 806) in accordance with the processes of S401 to S404 in FIG. 4.

The new feature point thus extracted is used when tracking of a feature point is failed in the next tracking destination feature point calculation process of S908.

At S910, the motion vector detection unit 116 performs a vector detection process relating to the tracking destination feature point at S908 in accordance with the processes of S405 to S408 in FIG. 4. Unlike S905, the vector detection process at S910 is performed on the basis of the tracking destination feature point 357 output by the tracking destination feature point determination unit 305. In this manner, after frame-in of an object is detected, acquisition of the vector information of the moving object 804 is continued as illustrated in FIG. 8E.

At S911, the CPU 112 determines whether the image capturing is completed. When the image capturing is completed, the processes of this flowchart are completed. When the image capturing is not completed, the process is returned to step S908, and the processes of S908 to S910 and the determination at subsequent S911 are performed for the next frame. That is, after it is determined that frame-in of a moving object has occurred, the digital camera 100 iterates the processes of S908 to S910 (second process set) for each of a plurality of captured images as a base frame in the order in which the images are captured. In the iterated processes, as the feature point of the tracking target (vector detection target) in each vector detection process (S910), a movement destination of each feature point indicated by the motion vector of each feature point detected in the last iteration is selected (S908). It should be noted that, a valid motion vector of a particular feature point may not be detected in the last iteration. In this case, in the current iteration, the motion vector detection unit 116 selects, from the processing region, a substitute feature point for the movement destination of the particular feature point on the basis of the processing region of the base frame.

Note that, in FIG. 9, the tracking destination feature point calculation process (S908) is performed before the vector detection process (S910) that is performed first after frame-in of a moving object. Accordingly, the feature point of the vector detection process (S910) that is performed first after the frame-in of the moving object is the movement destination of the feature point of the vector detection process (S905) at the frame-in of the moving object. That is, in FIG. 9, immediately after frame-in of a moving object is detected, the feature point to be subjected to the vector detection process is switched from the new feature point to the feature point of the movement destination (tracking destination). However, the switching timing may be delayed by one frame from the timing illustrated in FIG. 9. In this case, the process of S908 performed first after the frame-in of the moving object includes, at the motion vector detection unit 116, extracting the new feature point of the base frame in accordance with the process of S404 in FIG. 4. In addition, the process of S910 performed first after the frame-in of the moving object includes, at the motion vector detection unit 116, performing the vector detection process on the new feature point extracted at S908. In addition, the process at S907 is performed only once after the new feature point is extracted after the frame-in of the moving object.

As described above, according to the first embodiment, the digital camera 100 iterates the processes of S904 to S906 (first process set) for each of a plurality of captured images as a base frame in the order in which the images are captured until it is determined that frame-in of a moving object has occurred. In the iterated processes, the feature point of the tracking target (vector detection target) in each vector detection process (S905) is a feature point extracted (selected) anew for each grid square on the basis of the processing region of the base frame. In addition, after it is determined that frame-in of a moving object has occurred, the digital camera 100 iterates the processes of S908 to S910 (second process set) for each of a plurality of captured images as a base frame in the order in which the images are captured. In the iterated processes, as the feature point of the tracking target (vector detection target) in each vector detection process (S910), a movement destination of each feature point indicated by the motion vector of each feature point detected in the last iteration is selected (S908). Thus, a larger number of feature points corresponding to a frame-in moving object during image capturing can be tracked.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-080161, filed Apr. 18, 2018 which is hereby incorporated by reference herein in its entirety.

What is claimed is:

1. An image processing apparatus comprising one or more processors and a memory storing a program which, when executed by the one or more processors, causes the image processing apparatus to function as:
   a setting unit configured to set a first processing region in a part of a captured range;
   a selection unit configured to select a plurality of tracking target points in a first captured image of a plurality of captured images;
   a detection unit configured to detect a motion vector of each tracking target point between the first captured image and a second captured image subsequently captured after the first captured image;
a determination unit configured to determine whether a moving object has appeared in the first processing region; and
a control unit configured to perform control, for each of the plurality of captured images as the first captured image in an order in which the plurality of captured images are captured, to iterate a first process set including selecting by the selection unit, detecting by the detection unit, and determining by the determination unit until it is determined that the moving object has appeared in the first processing region, and to iterate a second process set including selecting by the selection unit and detecting by the detection unit after it is determined that the moving object has appeared in the first processing region, wherein in the first process set, the selection unit selects the plurality of tracking target points from the first processing region on a basis of the first processing region of the first captured image, and in the second process set, the selection unit selects, as the plurality of tracking target points for the second process set presently performed, a movement destination of each tracking target point indicated by the motion vector of each tracking target point detected in the second process set performed last time.

2. The image processing apparatus according to claim 1, wherein in the first process set, the determination unit determines whether the moving object has appeared in the first processing region on a basis of a difference between the motion vector of each tracking target point detected in the first process set performed last time and the motion vector of each tracking target point detected in the first process set presently performed.

3. The image processing apparatus according to claim 1, wherein:
the setting unit sets a plurality of divisional regions in the first processing region; and
in the first process set, the selection unit selects the tracking target point from each of the plurality of divisional regions of the first processing region on a one-by-one basis.

4. The image processing apparatus according to claim 1, wherein:
the setting unit sets a second processing region that is larger than the first processing region in the captured range; and
in a case where a valid motion vector for a particular tracking target point was not detected in the second process set performed last time, in the second process set presently performed, the selection unit selects, from the second processing region, a tracking target point serving as a substitute for a movement destination of the particular tracking target point on a basis of the second processing region of the first captured image.

5. The image processing apparatus according to claim 4, wherein the second processing region is an entirety of the captured range.

6. The image processing apparatus according to claim 1, wherein in the second process set subsequently performed after the first process set, the selection unit selects, as the plurality of tracking target points for the second process set presently performed, a movement destination of each tracking target point indicated by the motion vector of each tracking target point detected in the first process set performed last time.

7. The image processing apparatus according to claim 1, wherein in the second process set subsequently performed after the first process set, the selection unit selects the plurality of tracking target points from the first processing region on a basis of the first processing region of the first captured image.

8. An image processing apparatus comprising one or more processors and a memory storing a program which, when executed by the one or more processors, causes the image processing apparatus to function as:
a setting unit configured to set a first processing region in a part of a captured range of an image capturing unit;
a calculation unit configured to perform calculation of a feature point in the first processing region for a plurality of captured images sequentially captured by the image capturing unit; and
a control unit configured to perform processing to iterate the calculation of the feature point in the first processing region for the plurality of captured images until a moving object is detected in the first processing region on a basis of the feature point, and in response to a detection of the moving object, to track the feature point in a second processing region larger than the first processing region.

9. The image processing apparatus according to claim 8, wherein the program further causes the image processing apparatus to function as:
a display control unit configured to display an image captured by the image capturing unit on a display; and
an designation unit configured to designate the first processing region while an image captured by the image capturing unit is displayed on the display.

10. An image capturing apparatus comprising:
the image processing apparatus according to claim 1; and
an image sensor configured to generate the plurality of captured images.

11. An image capturing apparatus comprising:
the image processing apparatus according to claim 8; and
an image sensor configured to generate the plurality of captured images.

12. An image processing method executed by an image processing apparatus, comprising:
setting a first processing region in a part of a captured range;
selecting a plurality of tracking target points in a first captured image of a plurality of captured images;
detecting a motion vector of each tracking target point between the first captured image and a second captured image subsequently captured after the first captured image;
determining whether a moving object has appeared in the first processing region; and
performing control, for each of the plurality of captured images as the first captured image in an order in which the plurality of captured images are captured, to iterate a first process set including the selecting, the detecting, and the determining unit until it is determined that the moving object has appeared in the first processing region, and to iterate a second process set including the selecting and the detecting after it is determined that the moving object has appeared in the first processing region, wherein in the first process set, the plurality of tracking target points is selected from the first processing region on a basis of the first processing region of the first captured image, and in the second process set, a movement destination of each tracking target point, indicated by the motion vector of each tracking target point detected in the second process set performed last time, is selected as the plurality of tracking target points for the second process set presently performed.

13. A non-transitory computer-readable storage medium which stores a program for causing a computer to execute an image processing method comprising:

setting a first processing region in a part of a captured range;

selecting a plurality of tracking target points in a first captured image of a plurality of captured images;

detecting a motion vector of each tracking target point between the first captured image and a second captured image subsequently captured after the first captured image;

determining whether a moving object has appeared in the first processing region; and performing control, for each of the plurality of captured images as the first captured image in an order in which the plurality of captured images are captured, to iterate a first process set including the selecting, the detecting, and the determining unit until it is determined that the moving object has appeared in the first processing region, and to iterate a second process set including the selecting and the detecting after it is determined that the moving object has appeared in the first processing region, wherein in the first process set, the plurality of tracking target points is selected from the first processing region on a basis of the first processing region of the first captured image, and in the second process set, a movement destination of each tracking target point, indicated by the motion vector of each tracking target point detected in the second process set performed last time, is selected as the plurality of tracking target points for the second process set presently performed.

* * * * *